United States Patent
Kim

(10) Patent No.: US 9,302,555 B2
(45) Date of Patent: Apr. 5, 2016

(54) TIRE PRESSURE DETECTING MODULE AND TIRE PRESSURE DETECTING SYSTEM COMPRISING THE SAME

(71) Applicant: Hyundai Autron Co., Ltd., Seongnam-si (KR)

(72) Inventor: Kyung-Taek Kim, Seongman-Si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 47 days.

(21) Appl. No.: 14/135,412

(22) Filed: Dec. 19, 2013

(65) Prior Publication Data

US 2014/0176323 A1    Jun. 26, 2014

(30) Foreign Application Priority Data

Dec. 21, 2012   (KR) .......................... 10-2012-0150210

(51) Int. Cl.
*B60C 23/00* (2006.01)
*B60C 23/04* (2006.01)

(52) U.S. Cl.
CPC ......... *B60C 23/0408* (2013.01); *B60C 23/0416* (2013.01); *B60C 23/0462* (2013.01); *B60C 23/0489* (2013.01)

(58) Field of Classification Search
CPC ............ B60C 23/0415; B60C 23/0416; B60C 23/0488; B60C 23/0489; B60C 23/0408; B60C 23/0462
USPC ................ 340/442, 447; 701/29.1, 33.4, 34.4
See application file for complete search history.

(56) References Cited

U.S. PATENT DOCUMENTS

| 7,076,999 | B1 | 7/2006 | Knox | |
| 2011/0071737 | A1* | 3/2011 | Greer et al. | 701/49 |
| 2011/0169627 | A1* | 7/2011 | Fink | 340/442 |
| 2011/0313623 | A1* | 12/2011 | Greer et al. | 701/49 |
| 2012/0116607 | A1 | 5/2012 | Guinart | |

FOREIGN PATENT DOCUMENTS

| KR | 10-2011-0018946 A | 2/2011 |
| KR | 10-2012-0094476 A | 8/2012 |

* cited by examiner

*Primary Examiner* — Thomas Mullen
(74) *Attorney, Agent, or Firm* — Morgan, Lewis & Bockius LLP

(57) ABSTRACT

Provided are a tire pressure detecting module that simply identifies a position of a tire detecting module to automatically assign the position of the tire detecting module and a tire pressure detecting system including the same. The tire pressure detecting module includes a phase angle sensor detecting a phase angle of a wheel, a pressure detecting sensor detecting a pressure and temperature of a tire, a pressure detecting control unit selecting one transmission pattern of a plurality of transmission patterns, in which phase angle numbers are arranged, to calculate a standby time taken until a phase angle number of the selected transmission pattern and the detected phase angle of the wheel match each other, and a pressure detecting transmission part transmitting tire information including the pressure or temperature detected according to the selected transmission pattern, transmission pattern information that is information with respect to the selected transmission pattern, and the standby time.

14 Claims, 8 Drawing Sheets

| TRANSMISSION PATTERN NUMBER | PHASE ANGLE NUMBER | | | | |
|---|---|---|---|---|---|
| | FIRST | SECOND | THIRD | FOURTH | FIFTH |
| 0 | 3 | 2 | 4 | 7 | 1 |
| 1 | 0 | 2 | 5 | 1 | 7 |
| 2 | 1 | 5 | 1 | 5 | 1 |
| 3 | 0 | 1 | 3 | 5 | 7 |

| TRANSMISSION PATTERN NUMBER | PHASE ANGLE NUMBER | | | | |
|---|---|---|---|---|---|
| | FIRST | SECOND | THIRD | FOURTH | FIFTH |
| 0 | 3 | 2 | 4 | 7 | 1 |
| 1 | 0 | 2 | 5 | 1 | 7 |
| 2 | 1 | 5 | 1 | 5 | 1 |
| 3 | 0 | 1 | 3 | 5 | 7 |

FIG. 9

| WHEEL ROTATION DETECTING MODULE | ROTATION INFORMATION OF WHEEL | | | | |
|---|---|---|---|---|---|
| | t1 | t2 | t3 | t4 | t5 |
| 130FR | 10 | 46 | 10 | 34 | 70 |
| 130FL | 0 | 24 | 70 | 22 | 94 |
| 130RR | 70 | 94 | 10 | 58 | 82 |
| 130RL | 22 | 70 | 82 | 22 | 70 |

TIRE PRESSURE DETECTING MODULE AND TIRE PRESSURE DETECTING SYSTEM COMPRISING THE SAME

CROSS-REFERENCE TO RELATED APPLICATION

This application claims priority to Korean Patent Application No. 10-2012-0150210 filed on Dec. 21, 2012 and all the benefits accruing therefrom under 35 U.S.C. §119, the contents of which are incorporated by reference in their entirety.

BACKGROUND

The present invention disclosed herein relates to a tire pressure detecting module and a tire pressure detecting system including the same, and more particularly, to a tire pressure detecting module and a tire pressure detecting system including the same, in which a position of the tire pressure detecting module is simply identified and automatically assigned.

A tire pressure detecting system is a system enabling a driver to check a pressure state of a tire in real time by detecting a pressure and/or temperature of a tire and then transmitting the detected pressure and/or temperature to a driver's seat.

An extremely high or low air pressure of an automobile tire is likely to cause a tire to be punctured or a vehicle to easily skid, thus leading to big accident. Also, fuel consumption increases to deteriorate fuel efficiency, a service life of a tire is shortened, and also ride comfort and braking force becomes poor.

A safety device installed on a vehicle to prevent defects in a tire is a tire pressure detecting system. The tire pressure detecting system is configured such that a tire pressure detecting sensor installed on a wheel measures a pressure and/or temperature inside a tire and wirelessly transmits the measured information. However, during first installation, replacement or position change of a wheel or tire, it is difficult to identify which tire pressure detecting sensor transmits the pressure and/or temperature information that is wirelessly received.

SUMMARY

The present invention provides a tire pressure detecting module and a tire pressure detecting system including the same, in which a position of the tire pressure detecting module is simply identified and automatically assigned.

The present invention also provides a tire pressure detecting module and a tire pressure detecting system including the same, by using a plurality of transmission patterns in which a time point of transmitting a pressure value or temperature value is set depending on a phase angle of a wheel.

Objects of the present invention are not limited to the above, and thus other objects not described herein could be clearly understood by a person skilled in the art from the following disclosure.

In accordance with an exemplary embodiment of the present invention, a tire pressure detecting module includes: a phase angle sensor detecting a phase angle of a wheel; a pressure/temperature detecting sensor detecting a pressure and temperature of a tire; a pressure detecting control unit selecting one transmission pattern of a plurality of transmission patterns, in which phase angle numbers are arranged, to calculate a standby time taken until a phase angle number of the selected transmission pattern and the detected phase angle of the wheel match each other; and a pressure detecting transmission part transmitting tire information including the pressure or temperature detected according to the selected transmission pattern, transmission pattern information that is information with respect to the selected transmission pattern, and the standby time.

Details of other embodiments are included in the detailed description and drawings.

BRIEF DESCRIPTION OF THE DRAWINGS

Exemplary embodiments can be understood in more detail from the following description.

The following description was taken in conjunction with the accompanying drawings, in which:

FIG. 9 is a table showing rotation information of a plurality of wheels.

DETAILED DESCRIPTION OF EMBODIMENTS

Figure 1:
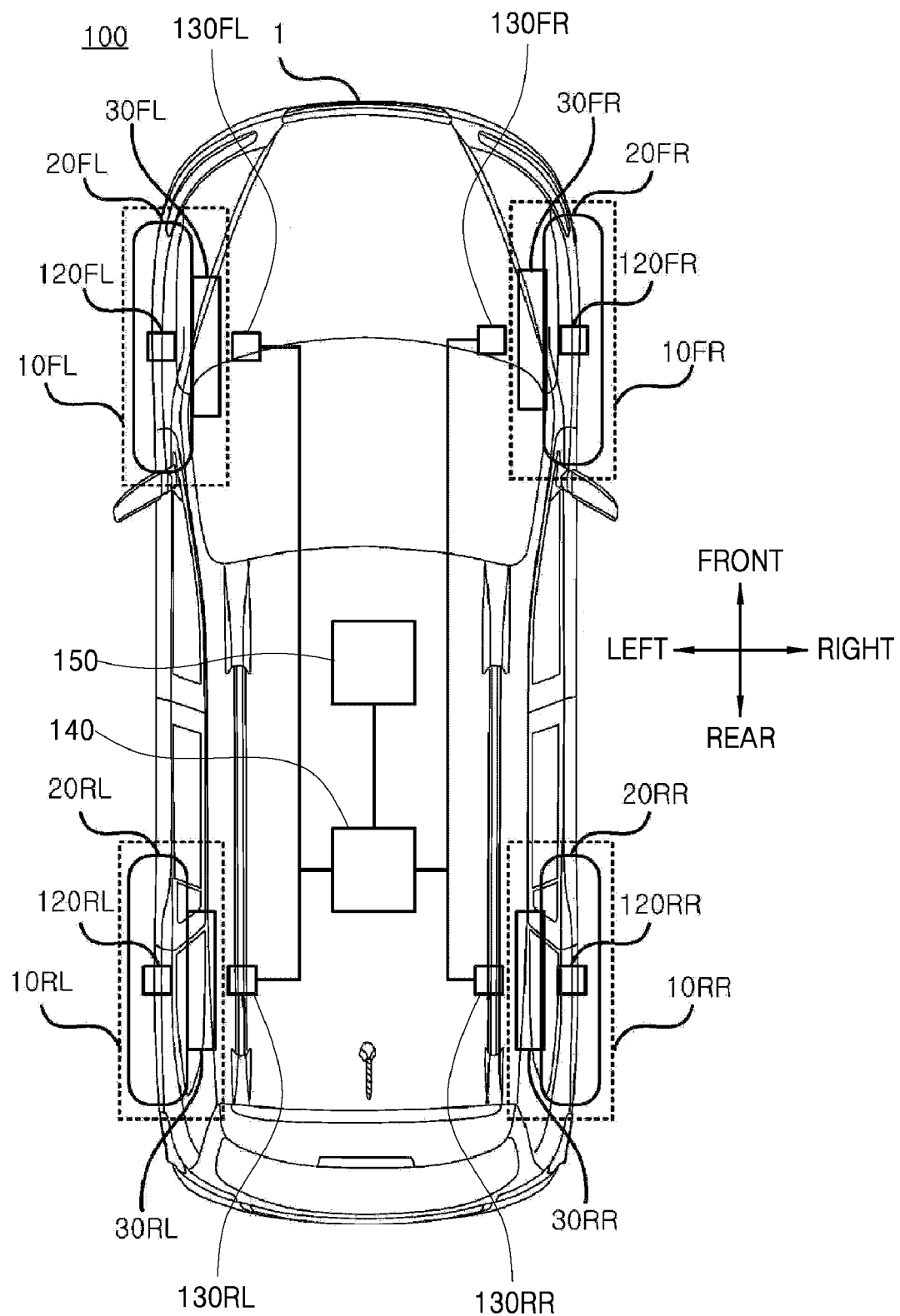
FIG. 1 illustrates a tire pressure detecting system in accordance with an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

The suffix "module" and "unit" for components, which are used in the description below, are assigned and mixed in consideration of only the easiness in writing the specification. That is, the suffix itself does not have different meanings or roles.

It is to be understood that each block of the block diagrams and flowcharts can be implemented by computer program instructions. The computer program instructions may be mounted on a general purpose computer or processor, special purpose computer or processor, or other programmable data processing apparatus to produce a machine or device. Execution of the instructions on the computer or other programmable data processing apparatus provides a means for implementing functions depicted in the diagrams and/or flowcharts. These computer program instructions are possible to be stored in a computer available or computer readable memory aiming at a computer or a programmable data processing equipment so as to implement functions with a specific method. Accordingly, the instructions stored in the computer available or computer readable memory are possible to create manufactured items including the instruction means performing functions explained in the flowchart block(s). Computer program instructions may be installed in a computer or programmable data processing equipment. Accordingly, the instructions, which create a process which is executed by a computer after a series of motion steps are performed in a computer or programmable data processing equipments to operate a computer or programmable data processing equipments, may provide steps for executing functions explained in flowchart block(s).

Moreover, each block can indicate a part of module, segment, or code including one or more executable instructions for executing specific logical function(s). In addition, it should be noted that, in some execution examples, the functions mentioned in blocks may be executed in another order. For example, two blocks which are consecutively drawn may be substantially simultaneously performed or may be performed in reverse order according to a corresponding function.

Hereinafter, the present invention will be described through embodiments thereof, with reference to drawings for illustrating a tire pressure detecting module and a tire pressure detecting system including the same.

FIG. 1 illustrates a tire pressure detecting system in accordance with an embodiment of the present invention;

A tire pressure detecting system 100 in accordance with an embodiment of the present invention includes tire pressure detecting modules, wheel rotation detecting modules, a tire information receiving module 150, and a control unit 140. The tire pressure detecting modules detect a pressure and/or temperature of tires and wirelessly transmit tire information including a pressure value and/or temperature value and other information. The wheel rotation detecting modules detect rotation information of wheels. The tire information receiving module 150 wirelessly receives the tire information transmitted from the tire pressure detecting modules. The control unit receives the rotation information of the wheel from the wheel rotation detecting modules, receives the tire information from the tire information receiving module 150, and automatically assigns a position of the tire pressure detecting modules.

In general, the wheel of a vehicle is provided in plurality. In the present embodiment, the wheel includes a front right wheel 10FR disposed at a front right side of a vehicle body 1, a front left wheel 10FL disposed at a front left side, a rear right wheel 10RR disposed at a rear right side, and a rear left wheel 10RL disposed at a rear left side.

The tire is mounted on an outer circumference of the wheel of the vehicle and formed of a rubber material. The tire is mounted on a rim of the wheel. The tire is provided in plurality, and, in the present embodiment, the tire includes a front right tire 20FR disposed at a front right side of the vehicle body 1, a front left tire 20FL disposed at a front left side, a rear right tire 20RR disposed at a rear right side, and a rear left tire 20RL disposed at a rear left side. The front right tire 20FR is included in the front right wheel 10FR; the front left tire 20FL is included in the front left wheel 10FL; the rear right tire 20RR is included in the rear right wheel 10RR; and the rear left tire 20RL is included in the rear left wheel 10RL.

The tire pressure detecting modules detect a pressure and/or temperature of the tire for identifying a level of an air pressure of the tire. The tire pressure detecting modules may calculate the air pressure of the tire, or detect other information such as pressure and temperature which allows the level of the air pressure to be identified. In the present embodiment, the tire pressure detecting modules detect the pressure and temperature of the tire.

The tire pressure detecting modules may be installed at various positions, for example, at a rim of the wheel or a side of the tire. The tire pressure detecting modules are provided in plurality. In the present embodiment, the tire pressure detecting modules include a front right tire pressure detecting module 120FR disposed at a front right side of the vehicle body 1, a front left tire pressure detecting module 120FL disposed at a front left side, a rear right tire pressure detecting module 120RR disposed at a rear right side, and a rear left tire pressure detecting module 120RL disposed at a rear left side. In the present embodiment, the front right tire pressure detecting module 120FR detects a pressure and temperature of the front right tire 20FR, the front left tire pressure detecting module 120FL detects a pressure and temperature of the front left tire 20FL, the rear right tire pressure detecting module 120RR detects a pressure and temperature of the rear right tire 20RR, and the rear left tire pressure detecting module 120RL detects a pressure and temperature of the rear left tire 20RL.

The tire pressure detecting modules detect a phase angle of the wheels along with the pressure and/or temperature of the tires. Each of the plurality of tire pressure detecting modules may have a unique identifier 210 that is a unique number for distinguishing it from the other tire pressure detecting modules. The plurality of tire pressure detecting modules may wirelessly transmit tire information including the detected tire pressure value 220 and/or temperature value and the unique identifier 210 to the tire information receiving module 150.

The tire pressure detecting modules stores a transmission pattern in which phase angle numbers given by uniformly dividing a phase angle of the wheel are arranged. Here, a plurality of transmission patterns having shapes different from each other may be stored. The tire pressure detecting modules select one transmission pattern of the plurality of transmission patterns to calculate a standby time that is taken until the phase angle number of the selected transmission pattern and the detected phase angle of the wheel match each other. The tire pressure detecting modules transmit the tire information in accordance with the transmission pattern selected by including transmission pattern information that is information of the selected transmission pattern and the standby time in the tire information.

Descriptions with respect to the tire pressure detection modules will be described below with reference to FIG. 2.

A wheel rotation detecting module detects rotation information of the wheel, which indicates a degree of rotation of the wheel. The wheel rotation detecting module is disposed on the wheel or the vehicle body 1 to detect the rotation information of the wheel through various methods.

In the present embodiment, teeth are disposed on a disc of the wheel that rotates together with the tire. Thus, the wheel rotation detecting module detects the passing teeth of the disc to output the detected result as the rotation information of the wheel. The wheel rotation detection module 130 provides a signal for detecting the passing teeth of the disc and generates a pulse when the teeth pass, and for detecting that portions on which the teeth are not disposed pass. In the present embodiment, the number of pulses generated by the wheel rotation detecting module may be the rotation information of the wheel. Various sensors such as a photo sensor, an inductive sensor, and a hall effect sensor which are capable of detecting the passing teeth may be used as a sensor for the wheel rotation detecting module.

The teeth of the disc may have a preset number. The number of teeth may vary according to a kind of vehicle or wheel. Thus, when the wheel makes one revolution, the number of pulses generated by the wheel rotation detecting module may be changed. In the present embodiment, 48 teeth may be provided on the disc 30. Thus, the wheel rotation detecting module generates 96 pulses when the wheel makes one revolution.

The wheel rotation detecting module detects the number of passing teeth at a predetermined time point to output pulse numbers corresponding thereto. If the number of pulses generated by the wheel rotation detecting module when the wheel makes one revolution is N-pul, the number $N\_sh$ of pulses outputted from the wheel rotation detecting module when the wheel rotates by an angle P from a predetermined position may be as follows.

$$\text{Number of pulse } N\_sh = Npul*(P/360 \text{ degrees})$$

For example, when the wheel rotates at an angle of about 45 degrees, the wheel rotation detecting module may output 12 pulses.

Although the wheel rotation detecting module is separately provided for the tire pressure detecting system 100, the wheel rotation detecting module may be a part of an anti-lock brake system (ABS) of the vehicle.

The wheel rotation detecting module is provided in plurality. In the present embodiment, the wheel rotation detecting module includes a front right wheel rotation detecting module 130FR disposed at a front right side of the vehicle body 1, a front left wheel rotation detecting module 130FL disposed at a front left side of the vehicle body 1, a rear right wheel rotation detecting module 130RR disposed at a rear right side of the vehicle body 1, and a rear left wheel rotation detecting module 130RL disposed at a rear left side of the vehicle body 1. Also, the disc is provided in plurality. The disc includes a front right disc 30FR disposed at a front right side of the vehicle body 1, a front left disc 30FL disposed at a front left side of the vehicle body 1, a rear right disc 30RR disposed at a rear right side of the vehicle body 1, and a rear left disc 30RL disposed at a rear left side of the vehicle body 1. The front right wheel rotation detecting module 130FR detects rotation information of the front right disc 30FR of the front right wheel 10FR, the front left wheel rotation detecting module 130FL detects rotation information of the front left disc 30FL of the front left wheel 10FL, the rear right wheel rotation detecting module 130RR detects rotation information of the rear right disc 30RR of the rear right wheel 10RR, and the rear left wheel rotation detecting module 130RL detects rotation information of the rear left disc 30RL of the rear left wheel 10RL.

The plurality of wheel rotation detecting modules transmit the rotation information of each of the wheels to the control unit 140. Each of the plurality of wheel rotation detecting modules is connected to the control unit 140 through a wire. Each of the plurality of wheel rotation detecting modules may be connected to the control unit 140 through a controller area network (CAN).

The tire information receiving module 150 wirelessly receives the tire information transmitted from the tire pressure detecting modules. The tire information receiving module 150 is provided in the vehicle body 1 to receive the tire information from each of the plurality of tire pressure detecting modules. The tire information receiving module 150 is connected to the control unit through a wire to transmit the received tire information to the control unit 140. The tire information receiving module 150 may be included in the control unit 140 in accordance with embodiments.

The control unit 140 receives the rotation information of each of the wheels from the plurality of wheel rotation detecting modules. The control unit 140 accumulates the rotation information of the wheel transmitted at a predetermined time point according to a time to store the accumulated value.

The control unit 140 determines a position of the tire pressure detecting modules from the rotation information of the wheel transmitted from the wheel rotation detecting module and the tire information transmitted from the tire information receiving module 150.

Although the control unit 140 is separately provided for the tire pressure detecting system 100, the control unit 140 may be an electronic control unit (ECU) for controlling states of a vehicle engine, an automatic transmission, and the ABS.

The control unit 140 determines which one of the plurality of tire pressure detecting modules transmits the tire information transmitted from the tire information receiving module 150 and then stores the determined result. The control unit 140 determines which one of the front right tire 20FR, the front left tire 20FL, the rear right tire 20RR, and the rear left tire 20RL corresponds to the tire information.

The control unit 140 determines whether one of the unique identifiers of the front right tire pressure detecting module 120FR, the front left tire pressure detecting module 120FL, the rear right tire pressure detecting module 120RR, and the rear left tire pressure detecting module 120RL corresponds to the unique identifier included in the tire information to store the determined result.

Detailed descriptions with respect to a position assignment method of the control unit 140 will be described below with reference to FIG. 7.

Figure 2:
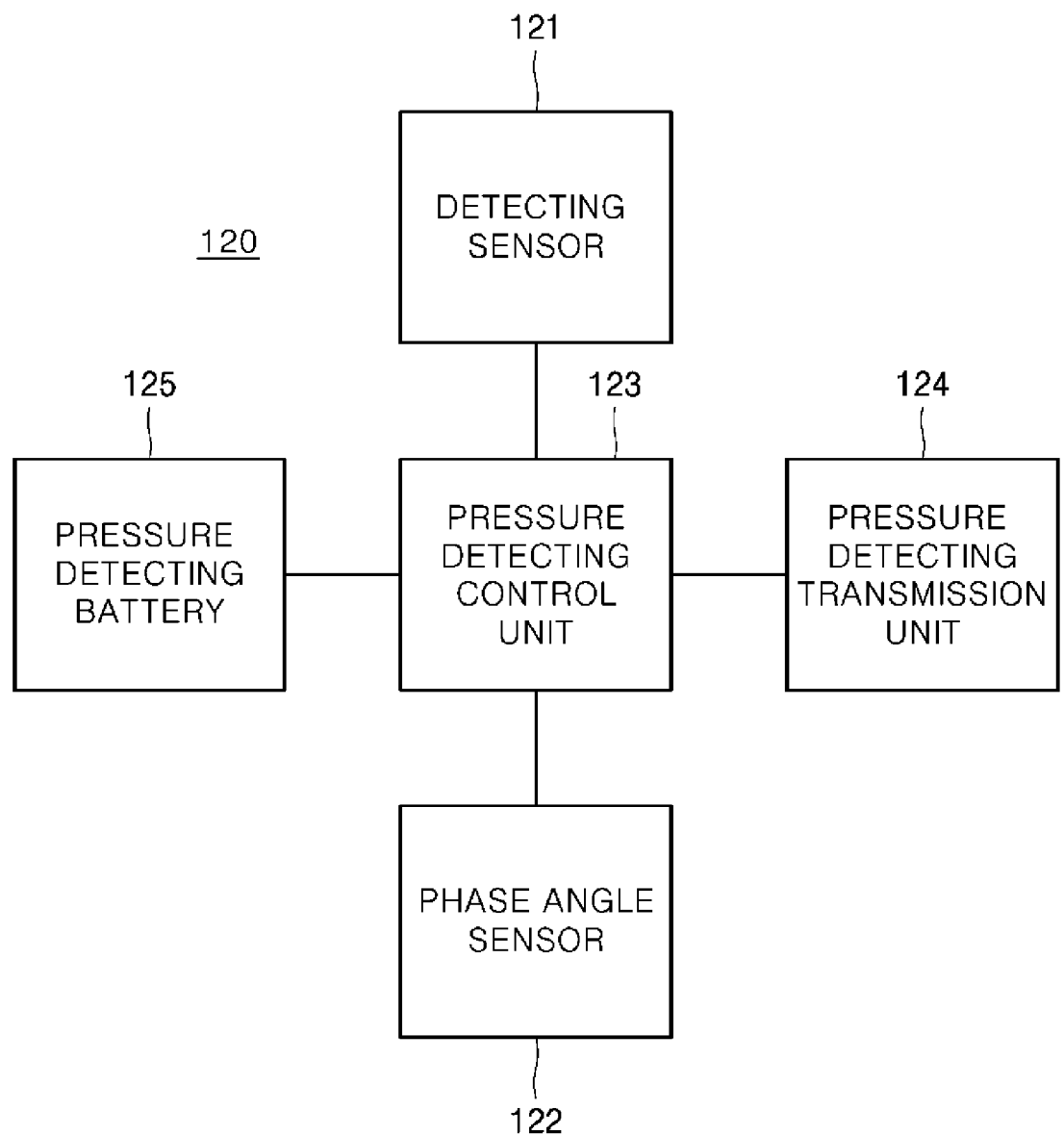
FIG. 2 is a block diagram illustrating a tire pressure detecting module in accordance with an embodiment of the present invention.
Figures 3, 4:
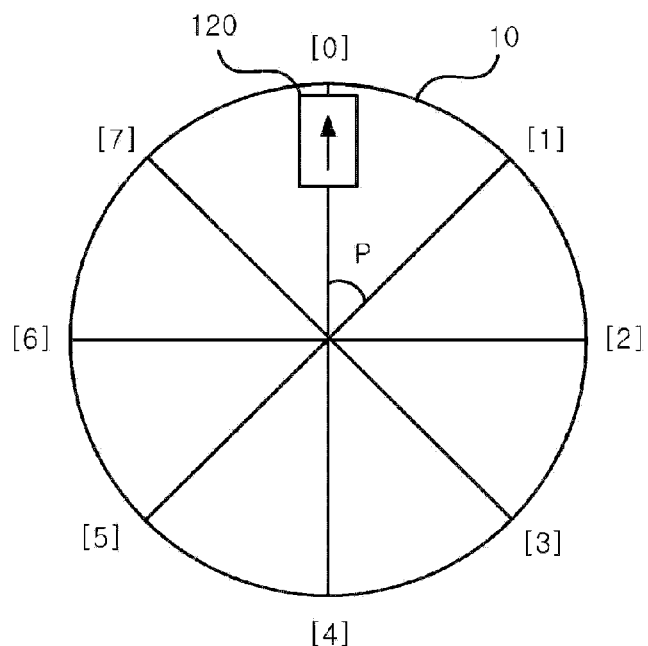
FIG. 3 illustrates a transmission position resolution of the tire pressure detecting module in accordance with an embodiment of the present invention.
FIG. 4 is a table showing a plurality of transmission patterns in accordance with an embodiment of the present invention.
Figure 5:
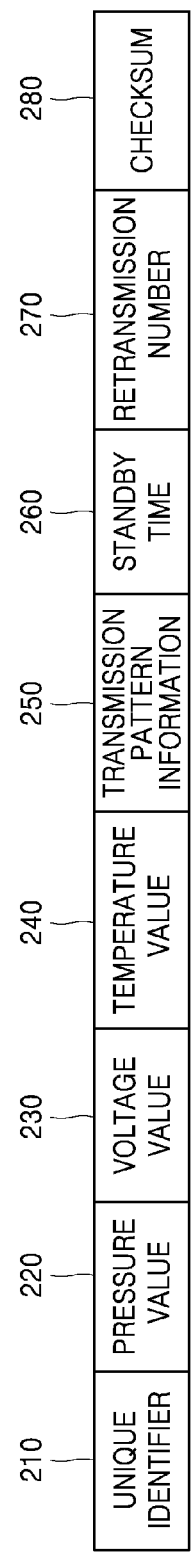
FIG. 5 illustrates a configuration of tire information in accordance with an embodiment of the present invention.

FIG. 2 is a block diagram illustrating a tire pressure detecting module in accordance with an embodiment of the present invention, FIG. 3 illustrates a transmission position resolution of the tire pressure detecting module in accordance with an embodiment of the present invention, FIG. 4 is a table showing a plurality of transmission patterns in accordance with an embodiment of the present invention, and FIG. 5 illustrates a configuration of tire information in accordance with an embodiment of the present invention.

The tire pressure detecting modules in accordance with an embodiment of the present invention includes a pressure/temperature detecting sensor 121 for detecting a pressure and/or temperature of the tire, a phase angle sensor 122 for detecting a phase angle of the wheel, a pressure detecting transmission unit 124 for wirelessly transmitting the tire information, a pressure detecting battery 125 for supplying power, and a pressure detecting control unit 123 for selecting one transmission pattern of the plurality of transmission patterns in which the phase angle numbers are arranged to calculate a standby time that is taken until a phase angle number of the selected transmission pattern and the phase angle of the wheel match each other.

The pressure/temperature detecting sensor 121 detects a pressure and/or temperature of the tire. The pressure/temperature detecting sensor 121 may measure the pressure and/or temperature of the tire through various methods to measure an air pressure of the tire. The pressure value and/or temperature value of the tire measured by the pressure/temperature detecting sensor 121 are(is) transmitted to the pressure detecting control unit to convert an analog signal into a digital signal.

The phase angle sensor 122 detects a phase angle of the wheel. The phase angle sensor 122 may detect a phase angle of the tire of the wheel, a phase angle of the rim of the wheel, or a phase angle of the tire pressure detecting modules installed on the wheel.

The phase angle sensor 122 may calculate an accurate phase angle from a reference point when the wheel rotates. However, in accordance with embodiments, the phase angle sensor 122 may measure a phase angle displacement for a preset time when the wheel rotates or output a signal when the wheel 1 rotates to reach a specific phase angle.

The phase angle sensor 122 may output an electrical signal according to a gravitational change, an electrical signal according to an acceleration change, or a signal when impacts against the ground occur. A piezoelectric sensor, an acceleration sensor, or an impact sensor may be used as the phase angle sensor 122 in accordance with a signal output method.

In the present embodiment, the phase angle sensor 122 may be an acceleration sensor that is installed to output an electrical signal in accordance with the gravitational change. The phase angle sensor outputs a signal having a continuously variable value similar to a sine curve in accordance with the rotation of the wheel.

Referring to FIG. 3, the tire pressure detecting modules are provided in a radius direction of the wheel to measure acceleration in the gravity direction. The tire pressure detection modules measure the acceleration in the radius direction of the wheels to output only an acceleration component in the gravity direction except for acceleration components according to the movement of the vehicle.

When the tire pressure detecting modules are disposed at the highest position of the wheels, the gravity may be maximized, and thus, the phase angle sensor 122 may output a minimum value. On the other hand, when the tire pressure detecting modules are disposed at the lowest portion of the wheels, the gravity may be minimized, and thus, the phase angle sensor 122 may output a maximum value.

Thus, when the phase angle sensor 122 outputs the minimum value during the rotation of the wheel, the phase angle P is about 0 (zero) degree. On the other hand, when the phase angle sensor 122 outputs the maximum value, the phase angle P is about 180 degrees. Also, when the phase angle sensor 122 outputs a middle value, the phase angle P is about 270 degrees. The phase angle sensor 122 may calculate the phase angle P in accordance with the continuous output values.

The signal outputted from the phase angle sensor 122 is transmitted to the pressure detecting control unit 123 to convert an analog signal into a digital signal.

The pressure detecting battery 125 supplies power into the pressure detecting control unit 123, the pressure/temperature detecting sensor 121, the pressure/temperature detecting sensor 121, the phase angle sensor 122, and the pressure detecting transmission unit 124. Since the tire pressure detecting modules are not connected to electric devices of the vehicle through a wire, a self battery is required for the tire pressure detecting modules. Thus, the pressure detecting battery 125 may serve as a power source for the tire pressure detecting modules. The pressure detecting battery 125 including a sensor (not shown) detects a voltage thereof to transmit the detected voltage value 230 to the pressure detecting control unit 123. Since the voltage value 230 of the pressure detecting battery 125 is transmitted into the control unit 140 in the state where the voltage value is included in the tire information, the control unit 140 may estimate a life-cycle of the pressure detecting battery 125.

The pressure detecting transmission unit 124 wirelessly transmits the tire information into the tire information receiving module 150. The pressure detecting transmission unit 124 outputs the tire information processed in the pressure detecting control unit 123 as an encoded radio frequency (RF) signal.

The pressure detecting control unit 123 receives the pressure value and/or temperature value of the tire detected by the pressure/temperature detecting sensor 121 to process the received pressure value and/or temperature value into the tire information. The pressure detecting control unit 123 converts analog signals corresponding to the pressure value and/or temperature value of the tire, which are(is) outputted from the pressure/temperature detecting sensor 121, into digital signals. The pressure detecting control unit 123 may process the pressure value and/or temperature value into the tire information to transmit the tire information into the pressure detecting transmission unit 124.

The pressure detecting control unit 123 stores the unique identifier. The unique identifier may be different in each of the tire pressure detecting modules and be expressed as a combination of numbers. The pressure detecting control unit 123 processes the stored unique identifier into the tire information to output the processed tire information.

The pressure detecting control unit 123 calculates a phase angle P of the wheel by using the signal that is outputted from the phase angle sensor 122. The pressure detecting control unit 123 converts the analog signal outputted from the phase angle sensor 122 into the digital signal to calculate the phase angle P of the wheel.

The pressure detecting control unit 123 stores the calculated phase angle P according to a time to calculate a phase angle cycle T from a change of the phase angle according to the time. Since the phase angle cycle T according to the traveling of the vehicle is variable, the pressure detecting control unit 123 continuously calculates and store the phase angle cycle T.

The pressure detecting control unit 123 sets the transmission pattern, in which phase angle numbers given by uniformly dividing the phase angle of the wheel are arranged, to a plurality of transmission patterns to store the plurality of transmission patterns. In the plurality of transmission patterns, the phase angle numbers are randomly arranged. Each of the phase angle numbers may be a unique number that is given at each of points defined by uniformly dividing one revolution of the wheel.

The one revolution of the wheel is uniformly divided into N_res numbers, and then N_res phase angle numbers are respectively given at the divided points. In accordance with embodiments, when the one revolution of the wheel is divided into the N_res numbers, the one revolution of the wheel may be non-uniformly divided. When the one revolution of the wheel is uniformly divided into the N_res numbers, and then the phase angle numbers from number 0 to number N_res−1 are given, a phase angle P of the wheel corresponding to the phase angle number N_ph may be calculated as follows.

Phase angle $P = (360 \text{ degrees}) * (N\_ph/N\_res)$

Referring to FIG. 3, in the present embodiment, the one revolution of the wheel is uniformly divided into 8 parts. The divided points of the wheel are given as phase angle numbers form number 0 to number 7 with respect to 12 o'clock in a clockwise direction, respectively. A phase angle difference of the wheel between the phase angle numbers may be about 45 degrees.

In the transmission pattern, the phase angle numbers are randomly designated and arranged by the preset numbers according to a time sequence. The transmission pattern is set in a plurality of patterns and stored in the pressure detecting control unit 123. A transmission pattern number that is a unique number is set in each of the plurality of transmission patterns. The transmission pattern number is given for each of the transmission patterns and stored in the pressure detecting control unit 123.

FIG. 4 illustrates an example in which the transmission pattern numbers and the phase angle numbers of each of the transmission patterns are given in the plurality of transmission patterns. In the present embodiment, five phase angle numbers are set in each of the transmission patterns, and the plurality of transmission patterns are set in four transmission patterns. The transmission pattern numbers from number 0 to number 3 are given in the four transmission patterns.

Phase angle numbers [0, 2, 5, 1, 7] are set in a second transmission pattern in which a transmission pattern number 1 is given. When the second transmission pattern is calculated into a phase angle of the wheel, the phase angle may be about 0 degrees, 90 degrees, 225 degrees, 45 degrees, and 315 degrees.

The pressure detecting control unit 123 selects one transmission pattern of the plurality of transmission patterns. The transmission pattern may be selected through various methods. The pressure detecting control unit 123 may select the transmission pattern number that is equal to a value obtained by dividing the unique identifier stored in the pressure detecting control unit 123 by the number of the transmission patterns. The pressure detecting control unit 123 may select the transmission pattern after a random processing is performed by using the unique identifier stored in the pressure detecting control unit 123 as a seed.

The pressure detecting control unit 123 calculates the phase angle P by using the signal outputted from the phase angle sensor 122 at a predetermined time point to calculate a standby time 260 that is taken until the calculated phase angle P matches a phase angle number of the selected transmission pattern. The pressure detecting control unit 123 calculates a standby time wt from a phase angle cycle T at the previously calculated present time point to the phase angle number of the selected transmission pattern. The pressure detecting control unit 123 may calculate the standby time wt by dividing the phase angle cycle T by a displacement between the present phase angle P and the phase angle number.

In the present embodiment, when the second transmission pattern is selected, and the detected present phase angle P is 180 degrees, since a first phase angle number of the second transmission pattern is zero, a displacement between the present phase angle P and the first phase angle number is 180 degrees, and the standby time wt is T/180 degrees.

The pressure detecting control unit 123 processes the tire information in accordance with the selected transmission pattern and the standby time. The tire information may include the unique identifier stored in the pressure detecting control unit 123, the pressure value and/or temperature value detected by the pressure/temperature detecting sensor 121, the transmission pattern information that is a transmission pattern selected by the pressure detecting control unit 123, the standby time, and various information.

Referring to FIG. 5, the tire information in accordance with the present embodiment sequentially processes and generates unique identifier 210, a pressure value 220, a voltage value 230, a temperature value 240, transmission pattern information 250, a standby time 260, the number of retransmissions 270, and a checksum 280.

The unique identifier is a number having a size of 32 bits. The pressure value is a value of the pressure of the tire which is detected by the pressure/temperature detecting sensor 121 in order to be transferred to the pressure detecting control unit 123 and has a size of 16 bits. The voltage value is a value of voltage of the pressure detecting battery 125 which is detected by the pressure detecting battery 125 itself in order to be transferred to the pressure detecting control unit 123 and has a size of 16 bits. The temperature value is a value of the temperature of the tire which is detected by the pressure/temperature detecting sensor 121 in order to be transferred to the pressure detecting control unit 123 and has a size of 16 bits.

The transmission pattern information is information on a transmission pattern selected by the pressure detecting control unit 123 from among a plurality of transmission patterns. The transmission pattern information has a size of 8 bits. The transmission pattern information includes a transmission pattern number of the selected transmission pattern and order information indicating an order of a phase angle number at the time of transmitting the tire information in the selected transmission pattern. The transmission pattern information is a number obtained by combining the transmission pattern number and the order information on the phase angle number.

Referring to FIG. 4, in the case where the selected transmission pattern is the second transmission pattern and the tire information for the phase angle number 5 that is the third phase angle number in the second transmission pattern is transmitted, the transmission pattern information is [13]. It may be understood that, in the case where the transmission pattern information is [24], the selected transmission pattern is the third transmission pattern and the phase angle number is 5 that is the fourth phase angle number of the third transmission pattern.

The standby time is a time taken until the phase angle P of the wheel calculated by the pressure detecting control unit 123 matches the phase angle number of the transmission pattern information. Here, the standby time has a size of 16 bits.

The number of retransmissions denotes the number of retransmitting the tire information. The tire information receiving module 150 may be unable to receive the tire information transmitted by the pressure detecting transmission unit 124 due to various noises or errors. Therefore, the pressure detecting control units repeatedly transmit the tire information through the pressure detecting transmission unit 124, wherein the values in the tire information is not changed except for the number of retransmission.

The number of retransmissions in the tire information is increased by 1 to be changed whenever the tire information is transmitted. The tire information may have a size of 8 bits. In accordance with an embodiment, the number of retransmission is set. In the present embodiment, the tire information is transmitted three times. Therefore, the number of retransmission has a value of 0 to 2. The tire information may be transmitted at regular time intervals. In the present embodiment, the interval of retransmission of the tire information is determined as t_repeat.

The checksum may be a value for checking integrity of data and may have a size of 8 bits.

In accordance with an embodiment, the order of the unique identifier, the pressure value, the voltage value, the temperature value, the transmission pattern information, the standby time, the number of retransmission, and the checksum included in the tire information may be changed. One of the pressure value and the temperature value, or the voltage value, or the number of retransmission, or the checksum may be excluded.

The pressure detecting control unit 123 transmits the tire information including all phase angle numbers of the transmission pattern selected according to the selected transmission pattern, through the pressure detecting transmission unit 124.

When the pressure detecting control unit 123 selects the second transmission pattern, the phase angle numbers of the second transmission pattern are [0, 2, 5, 1, 7]. Therefore, the standby time taken until the detected phase angle P matches the phase angle number 0 is calculated to transmit the tire information, the standby time taken until the detected phase angle P matches the phase angle number 2 is calculated to transmit the tire information, the standby time taken until the detected phase angle P matches the phase angle number 5 is calculated to transmit the tire information, the standby time taken until the detected phase angle P matches the phase angle number 1 is calculated to transmit the tire information, and the standby time taken until the detected phase angle P matches the phase angle number 7 is calculated to transmit the tire information.

In the present embodiment, the tire information includes the unique identifier, the pressure value, the voltage value, the temperature value, the transmission pattern information, the standby time, the number of retransmission, and the checksum. In according with an embodiment, the tire information may further include a vehicle type code indicting a vehicle type, a sensor mode indicating an operation mode of a sensor, and sensor information indicating failure information on the sensor.

Figure 6:
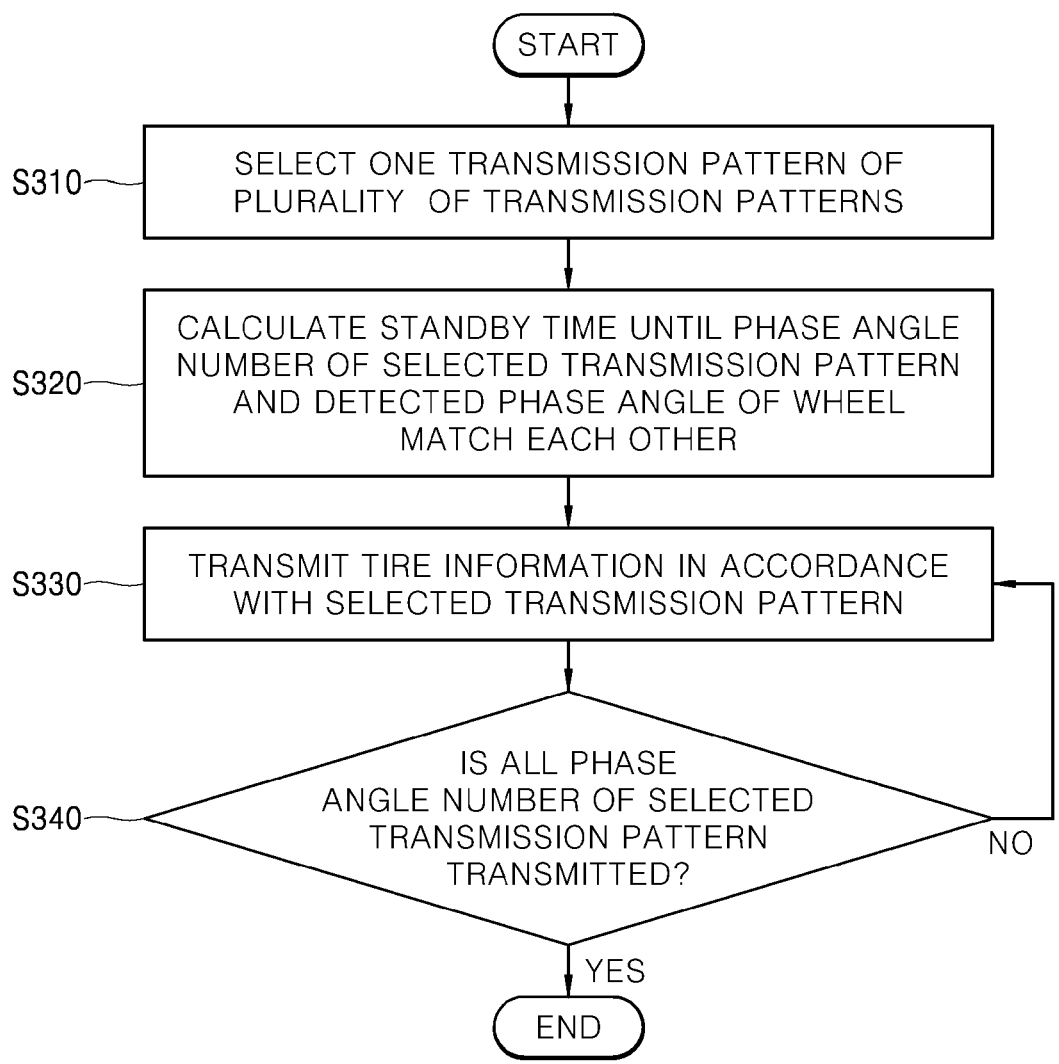
FIG. 6 is a flowchart illustrating a method for automatically assigning a position of the tire pressure detecting module in accordance with an embodiment of the present invention.

FIG. 6 is a flowchart illustrating a method for controlling a tire pressure detecting module in accordance with an embodiment of the present invention.

The tire pressure detecting modules select one of a plurality of transmission patterns (S310). The pressure detecting control unit 123 of the tire pressure detecting modules select one of a plurality of stored transmission patterns.

The tire pressure detecting modules transmit the tire information according to the selected transmission pattern (S320). The pressure detecting control unit 123 calculates the standby time taken until the phase angle of the wheel detected by the phase angle sensor 122 matches the phase angle number of the selected transmission pattern and processes the tire information to transmit the tire information through the pressure detecting transmission unit 124.

At an arbitrary time point, the pressure detecting control unit 123 processes the measured pressure value and temperature value received from the pressure/temperature detecting sensor 121 and the voltage value detected by the pressure detecting battery 125 together with the unique identifier, the transmission pattern information standby time, and the number of retransmission so as to transmit the processed information through the pressure detecting transmission unit 124.

The pressure detecting control unit 123 may repeatedly transmit the tire information through the pressure detecting transmission unit 124 at regular time intervals, wherein the values in the tire information is not changed except for the number of retransmission. The pressure detecting control unit 123 repeatedly transmits the tire information, in which only the number of retransmission is changed, a predetermined number of times at regular time intervals.

The tire pressure detecting modules determines whether all phase angle numbers of the selected transmission pattern have been transmitted (S330). The pressure detecting control unit 123 determines whether a set number of phase angle numbers of the selected transmission pattern have been transmitted so as to transmit the tire information corresponding to a next phase angle number according to a sequence if all the phase angle numbers have not been transmitted (S320).

In the present embodiment, the number of phase angle numbers is set to be 5 for each transmission pattern. Therefore, the pressure detecting control unit 123 transmits the tire information including the first to fifth phase angle numbers of the selected transmission pattern. The pressure detecting control unit 123 may check whether all pieces of order information at a rear position of the transmission pattern information of the tire information is transmitted from 1 to 5 the last digit of the transmission pattern information of the tire information, which indicates order information, is wholly received from 1 to 5 in order.

Regarding the above-described embodiment, the second transmission pattern is selected if the pressure detecting control unit 123 selects 1 from among the transmission pattern numbers. The pressure detecting control unit 123 transmits the tire information in which the transmission pattern information is [11] and the number of retransmission is [0], in response to the number 0 that is a first phase angle number from among the phase angle numbers of the second transmission pattern.

The pressure detecting control unit 123 only accumulates the number of retransmission to transmit the tire information three times at regular time intervals.

After the number of retransmission becomes [2], the pressure detecting control unit 123 transmits the tire information in which the transmission pattern information is [12] and the number of retransmission is [0], in response to the number 2 that is a second phase angle number from among the phase angle numbers of the second transmission pattern.

In a similar manner, the pressure detecting control unit 123 only accumulates the number of retransmission to transmit the tire information three times at regular time intervals.

When the tire information in which the transmission pattern information is [15] is transmitted three times by repeating the above-mentioned processes, the pressure detecting control unit 123 confirms that a rear position number of the transmission pattern information is [5] and the number of retransmission is [3], and then finishes the transmission of the tire information for the selected transmission pattern.

Figure 7:
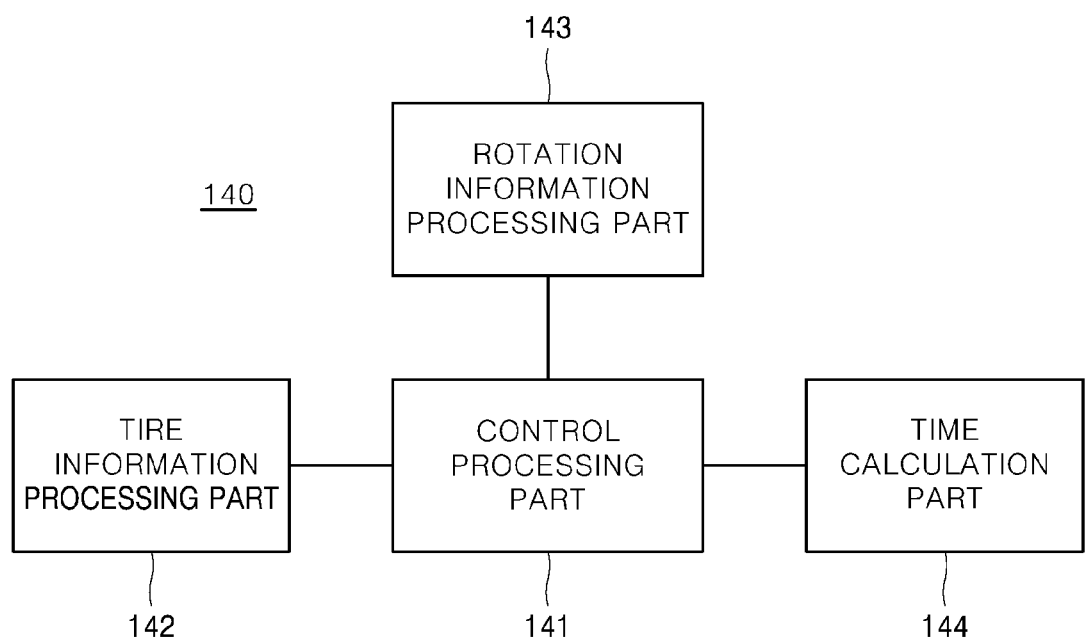
FIG. 7 is a block diagram illustrating a control unit in accordance with an embodiment of the present invention.

FIG. 7 is a block diagram illustrating a control unit in accordance with an embodiment of the present invention.

A control unit 140 in accordance with an embodiment of the present invention includes a rotation information processing part 143 for receiving rotation information of each wheel from a plurality of wheel rotation detecting modules to store and process the rotation information, a tire information processing part 142 for receiving the tire information received by the tire information receiving module 150 to store and process the tire information, a time calculation part 144 for calculating a time or time displacement, and a control processing part 141 for automatically allocating a position of the tire pressure detecting modules from the tire information processed by the tire information processing part 142 and the rotation information of the wheel processed by the rotation information processing part 143.

The rotation information processing part 143 receives the rotation information of each wheel from the plurality of wheel rotation detecting modules. The rotation information processing part 143 accumulates the rotation information of the wheel received from an arbitrary time point. The rotation information processing part 143 stores the rotation information of the wheel for each time point according to time information provided by the time calculation part 144.

For example, if the rotation information of the wheel recorded at an arbitrary time point is 10 and the wheel rotates 135 degrees so that the wheel rotation detecting module outputs 36 pulses, the rotation information processing part 143 records the rotation information at the time of the 135 degree rotation of the wheel as 46. Since 96 pulses are generated when the wheel rotates 360 degrees, the rotation information of the wheel is initialized to be 0 and is accumulated if the rotation information is greater than 96. If the rotation information of the wheel recorded at an arbitrary time point is 94 and the wheel rotates 45 degrees so that the wheel rotation detecting module outputs 12 pulses, the control unit 140 records the rotation information at the time of the 45-degree rotation of the wheel as 10.

The tire information processing part 142 calculates a transmission time of the tire information received from the tire information receiving module 150, and determines whether every phase angle information for a specific transmission pattern have been received. The tire information processing part 142 stores the tire information received from the tire information receiving module 150 together with the calculated transmission time. The tire information processing part 142 stores a plurality of the same transmission patterns as those of the pressure detecting control unit 123 of the tire pressure detecting modules.

The time calculation part 144 may include a resonant circuit to calculate a current time from a reference time or calculate a time displacement between different time points. The time calculation part 144 may provide time information to the rotation information processing part 143 so that the rotation information of the wheel is stored for each time point. The time calculation part 144 may provide the time information to the tire information processing part 142 so that the transmission time of the tire information is calculated.

The control processing part 141 matches the transmission pattern information included in the tire information processed by the tire information processing part 142 to the rotation information of the wheel processed by the rotation information processing part 143 so as to automatically allocate the position of the tire pressure detecting modules.

Figure 8:
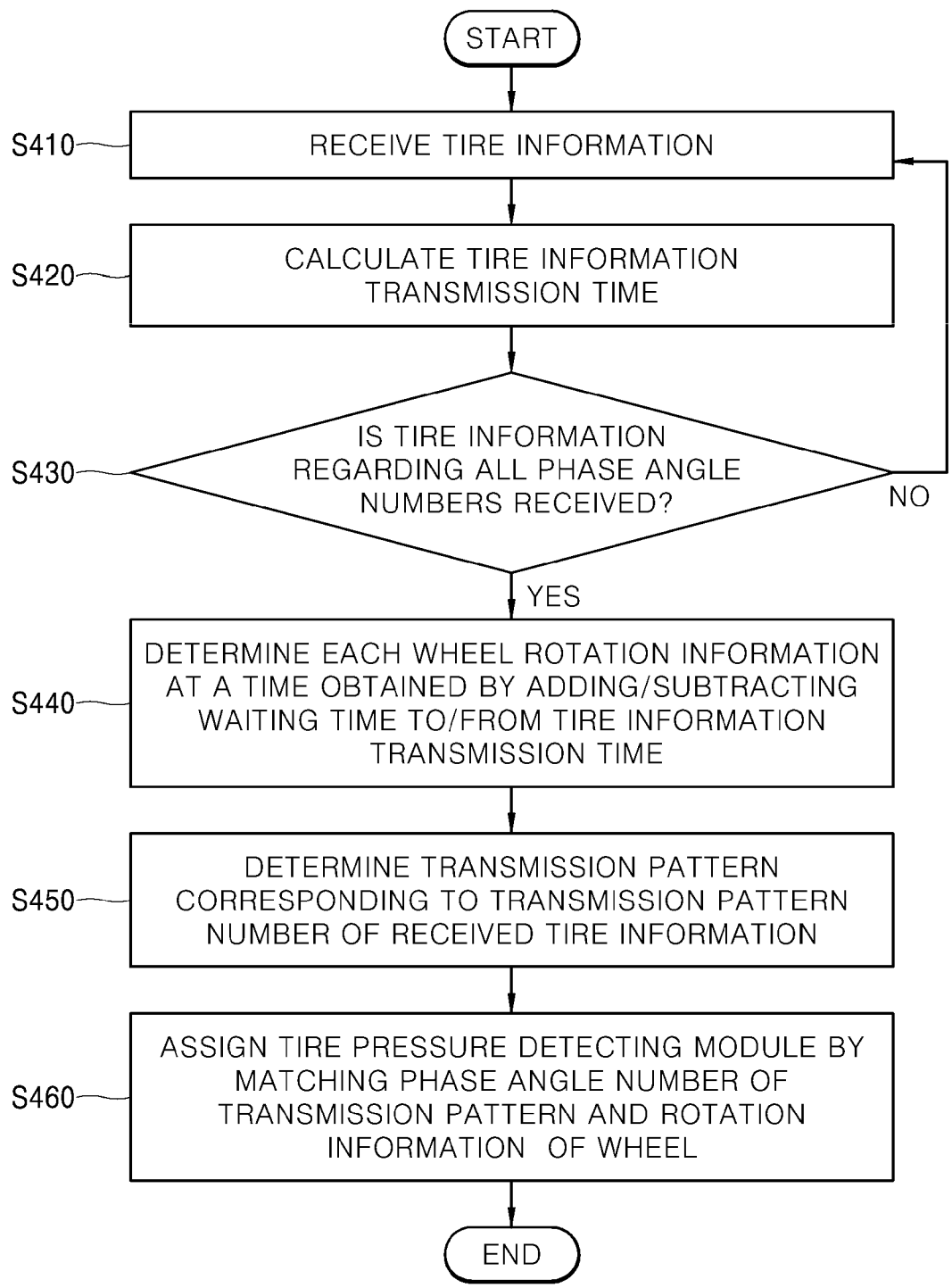
FIG. 8 is a flowchart illustrating a controlling method of a control unit in accordance with an embodiment of the present invention.

FIG. 8 is a flowchart illustrating a controlling method of a control unit in accordance with an embodiment of the present invention, and FIG. 9 is a table showing rotation information of a plurality of wheels.

The control unit 140 receives tire information through the tire information receiving module 150 (S410). The tire information receiving module 150 receives the transmitted tire information and delivers the tire information to the tire information processing part 142 of the control unit 140.

The control unit 140 calculates a transmission time of the received tire information (S420). The tire information processing part 142 of the control unit 140 calculates the corresponding transmission time of the tire information by using a receipt time of the tire information and re-transmission frequency included in the tire information. The tire information processing part 142 receives time information from the time calculation part 144 to identify the receipt time of the tire information.

Generally, delay between transmission and receipt through wireless communication is constant. In the present embodiment, the delay between transmission and receipt is constant when each of the plurality of tire pressure detecting modules transmits the tire information to the tire information receiving module 150. A time interval between a transmission time of the pressure detecting modules and a receipt time of the tire information receiving module 150 is the delay between transmission and receipt, which is defined as t_delay.

The pressure detecting modules re-transmit the tire information having different re-transmission frequency at regular intervals, and therefore the first transmission time for the tire information having the same values except for the re-transmission frequency is calculated according to the re-transmission frequency. In the present embodiment, a re-transmission interval of the tire information is t_repeat.

The tire information processing part 142 calculates the transmission time of the tire information by subtracting the delay between transmission and receipt and the time interval caused by the re-transmission from the time when the tire information is received. The time interval caused by the re-transmission is obtained by multiplying the re-transmission frequency by the re-transmission interval.

Assuming that the re-transmission frequency included in the tire information is R and the time when the tire information is received is t_receive, the transmission time of the tire information t_send is calculated by the following equation.

$$\text{Transmission time } t\_send = t\_receive - (t\_delay * R) - (t\_repeat * R)$$

The tire information processing part 142 stores the received tire information together with the transmission time.

The control unit 140 determines whether the tire information regarding all phase angle numbers of a specific transmission pattern is received (S430). The tire information processing part 142 of the control unit 140 determines whether the tire information of the specific transmission pattern is all transmitted through the transmission pattern information included in the tire information, and then, unless all the information is transmitted, the tire information processing part 142 continues to receive the tire information (S410).

In the present embodiment, since five phase angle numbers are set for each transmission pattern, the tire information processing part 142 confirms whether the tire information including first to fifth phase angle numbers is all received.

The tire information processing part 142 may confirm whether the last digit of the transmission pattern information of the tire information, which indicates order information, is wholly received from 1 to 5 in order. The tire information processing part 142 receives the tire information and then confirms the transmission pattern information. The tire information processing part 142 may recognize that if the transmission pattern information of the received tire information is [11], it corresponds to the first phase angle number. Then, the tire information processing part 142 receives the next tire information and confirms whether the transmission pattern information of the next tire information is [12]. The tire information processing part 142 receives the tire information until the transmission pattern information of the tire information is [15].

When the tire information processing part 142 confirms that the transmission pattern information of the received tire information is [12] and thereafter the transmission pattern formation of next received tire information is [14], it may be confirmed that there is an omission in tire information. In this case, the tire information processing part 142 waits until the tire information regarding new transmission pattern of which order information is 1 is received again.

Also, when the tire information processing part 142 confirms that the transmission pattern information of the received tire information is [12] and thereafter the transmission pattern formation of next received tire information is [24], it may be confirmed that the transmission pattern number is wrong. In this case, the tire information processing part 142 waits until the tire information regarding new transmission pattern of which order information is 1 is received again.

When the tire information processing part 142 confirms that the last digit of the transmission pattern information of the tire information, which indicates order information, is wholly received from 1 to 5 in order, the tire information processing part 142 stores it along with the calculated transmission time. For example, the tire information processing part 142 confirms that the transmission pattern information included in the tire information is received in order from [11] to [15] and then matches and stores all the received tire information with the transmission time.

When it is confirmed that the tire information regarding all phase angle numbers of the specific transmission pattern is received, the control unit 140 checks the stored tire information and determines rotation information of each wheel at a time obtained by adding/subtracting a standby time of the tire information to/from the transmission time of the tire information (S440).

The control processing part 141 determines an estimated time wt included in the tire information processed by the tire information processing part 142, and calculates an increase/decrease time t_p, which is obtained by adding/subtracting the standby time wt to/from the calculated transmission time t_sent. The increase/decrease time t_p is calculated by the following equation.

$$\text{Increase/decrease time } t\_p = t\_sent + wt$$

The control processing part 141 calls the whole rotation information of the wheel corresponding to the increase/decrease time tp from the rotation information of the wheel stored in the rotation information processing part 143.

For example, when the increase/decrease times tp of the multiple pieces of tire information stored in the tire information processing part 142 are respectively t1, t2, t3, t4 and t5, the rotation information of each wheel at each time of t1, t2, t3, t4 and t5 is called from the rotation information processing part 143, and listed as shown in FIG. 9.

The control unit 140 calls the transmission pattern corresponding to the transmission pattern number of the received tire information (S450). The control processing part 141 confirms the selected transmission pattern number by confirming the transmission pattern information of the multiple pieces of tire information stored in the tire information processing part 142. The control processing part 141 checks the first digit of the transmission pattern information to confirm the transmission pattern number. The control processing part 141 calls the transmission pattern corresponding to the transmission pattern number confirmed in the plurality of transmission patterns stored in the tire information processing part 142.

For example, when the transmission pattern information included in the tire information is between [11] and [15], the control processing part 141 confirms the transmission pattern number being 1 and calls a second transmission pattern from the tire information processing part 142.

The control unit 140 automatically assigns the tire pressure detecting modules by matching the phase angle number of the called transmission pattern and the called rotation information of the wheel (S460). The control processing part 141 determines whether a displacement of the called rotation information of the wheel is substantially equal to a displacement of the phase angle number of the called transmission pattern.

The displacement of the rotation information of the wheel is a difference between rotation information of the adjoining wheels on the basis of the increase/decrease time of the tire information, and the displacement of the phase angle number is a difference between the adjoining phase angle numbers of the tire information.

Assuming that the increase/decrease time of the nth tire information is t(n), the phase angle number included in the tire information is N_ph(n), and the rotation information of the wheel at the increase/decrease time of t(n) is N_sh(n), the displacement of the rotation information of the wheel between the transmission times t(n) and t(n+1) is $\Delta N\_sh = N\_sh(n+1) - N\_sh(n)$ and the displacement of the phase angle number is $\Delta N\_ph = N\_ph(n+1) - N\_ph(n)$.

Since it is impossible to directly compare the displacement of the rotation information of the wheel ($\Delta N\_sh$) with the displacement of the phase angle number ($\Delta N\_ph$), phase angle displacements thereof should be compared with each other.

The relationship between the displacement of the phase angle number ($\Delta N\_ph$) and the displacement of the rotation information of the wheel ($\Delta N\_sh$) is as follows.

$$\Delta P\_sh = 360 \text{ degrees} * (\Delta N\_sh / N\_pul)$$

(where, N_pul is number of pulses generated during one rotation of the wheel)

A phase angle displacement caused by the displacement of the phase angle number ($\Delta N\_ph$) is calculated by the following equation.

$$\Delta P\_phase = (360 \text{ degrees}) * (\Delta N\_ph / N\_res)$$

(where, N_res is split number of phase angle number)

The control processing part 141 calculates whether $\Delta P\_sh$ is substantially equal to $\Delta P\_phase$ to determine whether $\Delta P\_sh$ matches with $\Delta P\_phase$.

That is, $\Delta P\_sh \approx \Delta P\_phase$ is determined, which will be solved as follows. Here, the symbol of "≈" signifies "approximately equal".

$$360 \text{ degrees} * (\Delta N\_sh / N\_pul) \approx (360 \text{ degrees}) * (\Delta N\_ph / N\_res),$$

$$360 \text{ degrees} * ((N\_sh(n+1) - N\_sh(n)) / N\_pul)$$

$$\approx (360 \text{ degrees}) * ((N\_ph(n+1) - N\_ph(n)) / N\_res)$$

When the called transmission pattern is the second transmission pattern, the phase angle number of each tire information is [0, 2, 5, 1, 7] as shown in FIG. 4. Then, the displacement of the phase angle number of the second transmission pattern becomes [2, 3, 4, 6] which will be converted into [90, 135, 180, 270 degrees] as a phase angle.

Referring to FIG. 9, if the rotation information of the wheel of the front left wheel rotation detecting module 130FL is [0, 24, 70, 22, 94], the displacement becomes [24, 46, 48, 72]. Since 96 pulses are generated during one rotation, the displacement of [24, 46, 48, 72] becomes [90, 135, 180, 270 degrees] if the displacement is converted into a phase angle difference. Thus, the displacement above matches with the displacement of the phase angle number of the second transmission pattern.

The control processing part 141 assigns a unique identifier included in the tire information to the front left tire pressure detecting module 120FL. Therefore, the control processing part 141 automatically assigns the tire pressure detecting modules which transmits the tire information.

According to a tire pressure detecting module and a tire pressure detecting system including the same, in accordance with the present invention, there are one or more advantageous effects as follows.

The first advantageous effect is that collision between signals transmitted by a plurality of tire pressure detecting modules are less likely to occur, by using a plurality of transmission patterns in which phase angle numbers given by equally dividing a phase angle of a wheel with a tire installed are arranged.

The second advantageous effect is that each tire pressure detecting module can identify a displacement error by use of a transmission pattern individually selected, even if the displacement error of each wheel is small.

The third advantageous effect is that a position of the tire pressure detecting module can be automatically assigned using the plurality of transmission patterns, even in the case where a phase angle of a detected wheel differs from a phase angle number.

Advantageous effects of the present invention are not limited to the above, and thus other effects not described herein could be clearly understood by a person skilled in the art from claims.

Although the tire pressure detecting module and the tire pressure detecting system comprising the same have been described with reference to the specific embodiments, it(they) is(are) not limited thereto. Therefore, it will be readily understood by those skilled in the art that various modifications and changes can be made thereto without departing from the spirit and scope of the present invention defined by the appended claims.

What is claimed is:

1. A tire pressure detecting module comprising:
   a phase angle sensor detecting a phase angle of a wheel;
   a sensor detecting a pressure or a temperature of a tire;
   a pressure detecting control unit selecting one transmission pattern of a plurality of transmission patterns, in which phase angle numbers are arranged, to calculate a standby time taken until a phase angle number of the selected transmission pattern and the detected phase angle of the wheel match each other; and
   a pressure detecting transmission unit transmitting tire information comprising the pressure or the temperature detected according to the selected transmission pattern, transmission pattern information that is information with respect to the selected transmission pattern, and the standby time.

2. The tire pressure detecting module of claim 1, wherein the pressure detecting control unit stores a unique identifier that is capable of identifying the tire pressure detecting module, and
   the tire information further comprises the unique identifier.

3. The tire pressure detecting module of claim 1, wherein the phase angle numbers are given by evenly dividing the detected phase angle of the wheel.

4. The tire pressure detecting module of claim 1, wherein the transmission pattern information comprises a transmission pattern number that is a unique number set for the selected transmission pattern.

5. The tire pressure detecting module of claim 1, wherein the transmission pattern information comprises an order of the phase angle numbers in the selected transmission pattern.

6. The tire pressure detecting module of claim 1, further comprising a pressure detecting battery supplying power into the phase angle sensor, the sensor, the pressure detecting control unit, and the pressure detecting transmission unit,
   wherein the tire information further comprises a voltage value of the pressure detecting battery.

7. The tire pressure detecting module of claim 1, wherein the pressure detecting transmission unit retransmits the tire information, and
   the tire information further comprises a retransmission number that is a number of times the tire information has been retransmitted.

8. The tire pressure detecting module of claim 1, wherein the pressure detecting control unit determines whether all the phase angle numbers of the selected transmission pattern are transmitted.

9. A tire pressure detecting system comprising:
   tire pressure detecting modules detecting a phase angle of each of a plurality of wheels and a pressure or temperature of a tire, selecting one transmission pattern of a plurality of transmission patterns, in which phase angle numbers are arranged, calculating a standby time taken until a phase angle number of the selected transmission pattern and the detected phase angle of the wheel match each other and transmitting tire information comprising the pressure or temperature detected according to the selected transmission pattern, transmission pattern information that is information with respect to the selected transmission pattern, and the standby time;
   a wheel rotation detecting module detecting rotation information that is information with respect to a degree of rotation of each of the plurality of wheels;
   a tire information receiving module receiving the tire information transmitted from the tire pressure detecting module; and
   a control unit automatically assigning a position of the tire pressure detecting module from rotation information transmitted from the wheel rotation detecting module, and the transmission pattern information in tire information transmitted from the tire information receiving module.

10. The tire pressure detecting system of claim 9, wherein the control unit calculates a transmission time of the tire information transmitted from the tire information receiving module to determine the rotation information corresponding to an increase/decrease time which is obtained by adding/subtracting the standby time to/from the transmission time.

11. The tire pressure detecting system of claim 9, wherein the control unit matches the phase angle number of the transmission pattern with the rotation information to automatically assign the position of the tire pressure detecting module.

12. The tire pressure detecting system of claim 9, wherein the control unit determines whether a displacement of the phase angle number of adjoining wheels on the basis of an increase or decrease time of the tire information and a displacement of the determined rotation information of the adjoining wheels on the basis of the increase or decrease time of the tire information substantially match each other to automatically assign the position of the tire pressure detecting module.

13. The tire pressure detecting system of claim 9, wherein the phase angle numbers are given by evenly dividing the detected phase angle of the wheel.

14. The tire pressure detecting system of claim 9, wherein the control unit determines whether all the phase angle numbers of the selected transmission pattern are transmitted.

* * * * *